United States Patent [19]
Fukami et al.

[11] Patent Number: 5,097,360
[45] Date of Patent: Mar. 17, 1992

[54] ZOOM LENS CAPABLE OF CHANGING A RANGE OF VARIABLE FOCAL LENGTH

[75] Inventors: Kiyoshi Fukami, Tokyo; Jun Hosoya, Kanagawa, both of Japan

[73] Assignee: Canon Kabushiki Kaisha, Tokyo, Japan

[21] Appl. No.: 742,474

[22] Filed: Aug. 5, 1991

Related U.S. Application Data

[63] Continuation of Ser. No. 417,697, Oct. 5, 1989, abandoned.

[30] Foreign Application Priority Data

Oct. 7, 1988 [JP] Japan .................................. 63-253453
Oct. 7, 1988 [JP] Japan .................................. 63-253457

[51] Int. Cl.$^5$ ............................................. G02B 15/04
[52] U.S. Cl. ................................................... 359/674
[58] Field of Search ................. 350/422, 423, 427; 359/674

[56] References Cited

U.S. PATENT DOCUMENTS

| | | | |
|---|---|---|---|
| 3,751,136 | 8/1973 | Kirchoff | 350/420 |
| 4,015,895 | 4/1977 | Hirose | 350/422 |
| 4,146,305 | 3/1979 | Tanaka | 350/427 X |
| 4,240,697 | 12/1980 | Takano | 350/422 |
| 4,318,592 | 3/1982 | Tanaka | 350/427 |
| 4,330,180 | 5/1982 | Tanaka | 350/427 |

FOREIGN PATENT DOCUMENTS

51-81634  7/1976  Japan .

Primary Examiner—Scott J. Sugarman
Attorney, Agent, or Firm—Fitzpatrick, Cella, Harper & Scinto

[57] ABSTRACT

A zoom lens capable of changing the range of variable focal length to another limit, comprising, from front to rear, a zoom section including a variator and a compensator arranged upon zooming movement to vary the focal length in a predetermined range, a diaphragm, and a relay lens section receptive of the afocal light beam from the zoom section to form an image and having a front lens unit and a rear lens unit, the front lens unit being provided with a fixed sub-unit and an interchangeable sub-unit in this order from the front, wherein the interchangeable sub-unit is removed to create a space between the fixed sub-unit and the rear lens unit, into which a range changing lens unit is then inserted, so that the range of variable focal length is changed.

5 Claims, 9 Drawing Sheets

ZOOM LENS CAPABLE OF CHANGING A RANGE OF VARIABLE FOCAL LENGTH

This application is a division of application Ser. No. 07/417,697 filed Oct. 5, 1989, now abandoned.

BACKGROUND OF THE INVENTION

1. Field of the Invention

This invention relates, to zoom lenses capable of changing a range of variable focal length suited to television cameras or video cameras and, more particularly, zoom lenses capable of changing a range of variable focal length in which a space of the relay lens unit is utilized to detachably set a range changing lens unit therein to shift the range of variable focal length of the entire lens system toward the longer focal length and whose back focal distance is long enough to arrange, for example, a three-color separation optical system therein, suited to be used in the imaging system of the color television camera, etc.

2. Description of the Related Art

From the past, there have been proposed a variety of zoom lenses capable of changing a range of variable focal length from the ordinary limit to another one of different focal length, or changeable range zoom lenses.

Of these, the photographic lens of the type having a range changing lens unit built therein as arranged to move into, or away from, a part of the relay lens which is stationary behind the zoom section, when the range of variable focal length is changed, or the so-called built-in extender type, has found its use in many television cameras. With this type, it is in an instant that the range of variable focal length can be extended, and moreover the back focal distance of the whole lens system is kept unchanged during the extending of the range. Another excellent feature is that the total length of the lens remains constant.

The utilization of the built-in extender method in zoom lenses is proposed in, for example, Japanese Laid-Open Patent Application No. Sho 51-81634 and Japanese Patent Publication No. Sho 58-33528.

Of these, the Japanese Patent Publication No. Sho 58-33528 (U.S. Pat. No. 4,240,697) provides a zoom lens constructed from a zoom section and a relay lens unit. In turn, the relay lens unit is constructed from a relay front unit of negative refractive power and a relay rear unit of positive refractive power to thereby create a space therebetween. This space is either left empty, or occupied by a thick glass. And the relay front unit, or if the thick glass is present, the relay front unit and the thick glass, is or are retracted out of the optical path, and the thus-formed vacant space is used in attaching the range changing lens unit, so that the range of variable focal length is changed.

This method, because of its amenability to secure the space for the range changing lens unit, gets advantages of easily correcting aberrations, while nevertheless permitting the total length of the lens, too, to be shortened with relative ease. Since the zoom lens of that publication, however, has its stop positioned in front of the compensator of the zoom section, because, in some optical arrangement, the exit pupil gets nearer when the range changing lens unit is removed, or when in the ordinary condition, the television camera using the three-color separation optical system will suffer from appearance of color shading. Another problem is that the effective diameter of the relay rear unit tends to increase.

From these reasons, in recent years, a method of bringing the stop to the front of the relay lens unit within a similar arrangement for changing the range of variable focal length, has been used in many zoom lenses. However, alternative problems arise that, as the stop approaches the relay lens unit, the stop drive mechanism and the mechanism for attaching or detaching the range changing lens unit get closer to each other to increase the possibility of occurrence of mechanical interference therebetween, and that it becomes very difficult to locate all the elements and hold a high degree of tolerance on their structural spacings.

Besides this, as the method of changing the range of variable focal length of the zoom lens, it has also been put into practice that the front part of the relay lens unit is made fixed, and the space between the front and rear parts of the relay lens unit, or, if the thick glass is present, a space created by moving that thick glass away from the optical path, is used in attaching the range changing lens unit.

This method, due to its features that the relay front unit remains stationary during the time when the range changing lens unit is attached, and that the operating mechanism for the range changing lens unit can be assembled farther away from the operating mechanism for the stop by a distance equal to the axial thickness of the relay front unit, prevents both mechanisms from falling so close as to interfere with each other.

However, the use of this method in connection with the aim of increasing the back focal distance leads to a problem of increasing the diameter of the light beam in the relay lens unit which in turn calls for a great increase of the diameter of the range changing lens attachment unit to be used.

Further, in order to bring the exit pupil to a farther position, a thick glass must be used as inserted into the space between the relay front unit and the relay rear unit after the range changing lens has been detached, thereby producing another problem that the weight of the whole relay lens unit comes to increase largely.

As the zoom lens with the extending lens to be used in the space of the relay lens unit, mention may be made of U.S. Pat. Nos. 4,330,180, 4,318,592, 4,015,895 and 3,751,136.

SUMMARY OF THE INVENTION

An object of the invention is to provide a lens which preserves good aberration correction even in the changed range, and enables the lens interchanging mechanism and the stop drive mechanism to be arranged without causing mechanical interference.

Another object is to provide a zoom lens of long back focal distance.

According to the invention, a zoom lens comprises, from front to rear, a zoom section including a lens unit having the focusing function and the function of varying the image magnification, a stop whose aperture opening is variable in size, and a relay lens unit stationary during focusing and zooming and having the image forming function, wherein the relay lens unit is constructed as comprising a relay front unit and a relay rear unit with the widest air spacing taken at the boundary therebetween, and the relay front unit is constructed as comprising a fixed sub-unit and a detachably mounted interchangeable sub-unit, whereby the interchangeable sub-unit is retracted from the optical path and then a range changing lens unit is inserted into the optical path between the fixed sub-unit and the relay rear unit, so that the range of variable focal length of the entire lens system is extended toward the longer focal length. And, the composite refractive power of the zoom section and the refractive power of the fixed sub-unit are of opposite sign. That is, when the zoom section is negative, the fixed sub-unit is positive. When the zoom section is positive, the fixed sub-unit is negative.

In addition, the minimum spacing between the last movable lens unit of the zoom section and the relay lens unit is longer than the spacing between the fixed sub-unit and the interchangeable sub-unit.

BRIEF DESCRIPTION OF THE DRAWINGS

In the sectional views and the aberration curves, FIGS. 1(A), 2(A), 3(A) and 4(A) are before the range of variable focal length changes, while FIGS. 1(B), 2(B), 3(B) and 4(B) are after the range of variable focal length changes.

In the sectional views and the aberration curves, FIGS. 5(A), 6(A), 7(A) and 8(A) are before the range of variable focal length changes, while FIGS. 5(B), 6(B), 7(B) and 8(B) are after the range of variable focal length changes.

DETAILED DESCRIPTION OF THE PREFERRED EMBODIMENTS

Figure 1A:
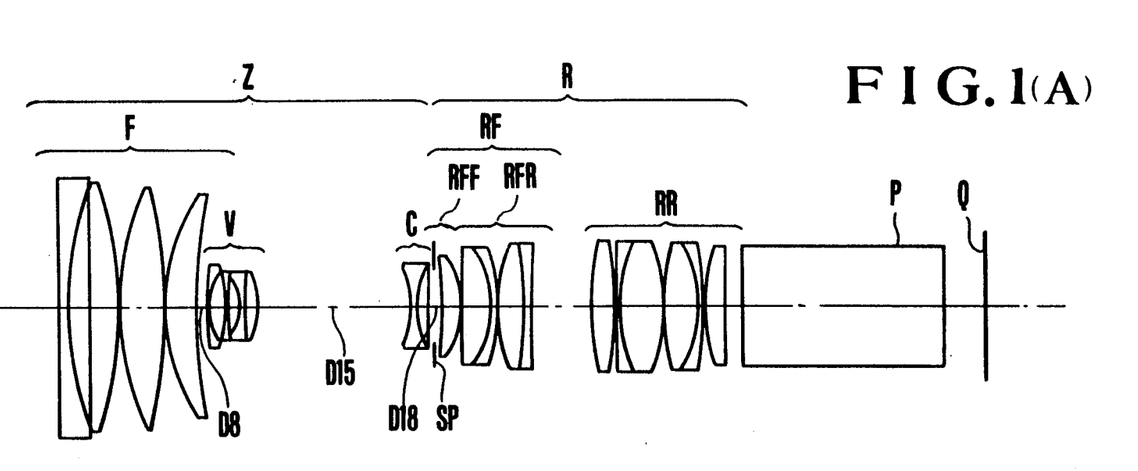
FIGS. 1(A) and 1(B) and FIGS. 2(A) and 2(B) are longitudinal section views of numerical examples 1 and 2 of specific zoom lenses of the invention respectively.

FIG. 1(A) in lens block diagram shows one embodiment of a zoom lens capable of changing the range of variable focal length according to the invention as the focal length varies in the ordinary range (from the shortest focal length to the longest focal length). The zooming position illustrated here is the wide-angle end. In the figure, reference character F denotes a positive focusing lens having the focusing function, reference character V denotes a negative variator which moves along an optical axis linearly over the entire zooming range when it acts to vary the magnification. Reference character C denotes a negative compensator which moves along the optical axis non-linearly to compensate for the shift of an image plane as the magnification varies. The focusing lens unit F, the variator V and the compensator C constitute a zoom section Z of negative refractive power. Reference character SP denotes an aperture stop. Reference character R denotes a relay lens unit which remains stationary during focusing and zooming. The relay lens unit R is comprised of a relay front unit RF and a relay rear unit RR with the widest air separation taken at the boundary. Of these, the relay front unit RF is constructed as comprising a front part of positive refractive power which is fixed, i.e., a fixed sub-unit RFF, and a rear part which is made removable in order to be interchanged with another lens unit, i.e., an interchangeable sub-unit RFR.

Reference character P denote a three-color separation optical system formed from a prism and others, shown in developed form of an equivalent block. Reference character Q denotes an image plane.

In the present embodiment, the variator V and the compensator C are moved to vary the magnification in an ordinary range of, for example, the focal length f=10-100, that is, a zoom lens having a zoom ratio of 10 is achieved, as shown in the numerical examples to be described later.

Figure 1B:
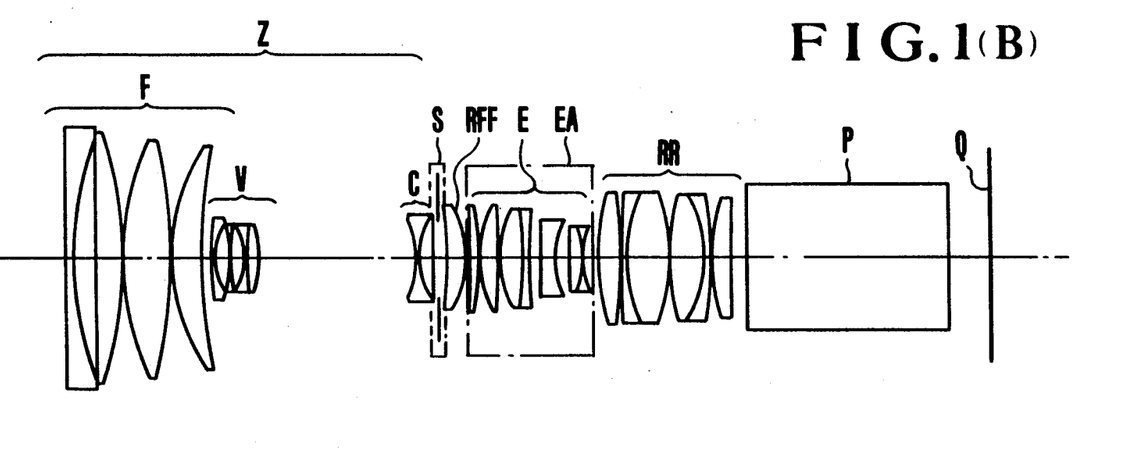

And, to change the range of variable focal length to another limit, the relay front unit RF is rid of the interchangeable sub-unit RFR from the interior of the optical path, leaving the fixed sub-unit RFF, and then a range changing lens unit E having a different refractive power from that of the interchangeable sub-unit RFR is inserted into the optical path within the relay lens unit R at a point between the fixed sub-unit RFF and the relay rear unit RR, as shown in FIG. 1(B). The range changing lens unit E is formed to a telephoto system, while the interchangeable sub-unit RFR is a non-telephoto system.

By this, the focal length f at any zooming station is changed toward the longer focal length side than before the change, for example, 2 times, as a whole, to a range of f=20 to 200, as shown in the numerical examples to be described later.

It should be noted in FIG. 1(B) that a stop drive mechanism S and a range changing lens unit attaching and detaching mechanism EA can be positioned in sufficiently spaced apart relation.

In such a manner, in the present embodiment, by taking the form that the relay front unit RF is partly interchanged with the range changing lens unit E so that the fixed sub-unit RFF of positive refractive power is left and the interchangeable sub-unit RFR of positive or negative refractive power is removed, a zoom lens which little suffers variation of the aberrations between before and after the change of the range of variable focal length, and has a good optical performance throughout the entire zooming range is obtained. The use of the fixed sub-unit RFF arranged behind the stop leads to a possibility of spacing apart the stop drive mechanism S and the range changing lens unit attaching and detaching mechanism EA, thereby giving additional advantages that both mechanisms can be made not to interfere with each other and that the diameter of the incident light beam on the range changing lens unit E is minimized and the aberrational problem is made easy to solve.

It should be pointed out that in the present embodiment the requirement of keeping the long back focal distance and the requirement of shortening the total length of the entire lens system in such a manner that good correction of aberrations is preserved must be fulfilled at once. For this purpose, it is preferred first to set forth the following condition:

$$-2.0 \leq fRFF/(fZ-EZ) \leq 0.6 \quad (1)$$

where fRFF is the focal length of the fixed sub-unit RFF, fZ is the focal length of the zoom section Z at an arbitrary zooming position when focusing on an infinitely distant object, and EZ is the interval between the rear principal point of the zoom section Z and the front principal point of the fixed sub-unit RFF. The inequalities of condition (1) have a main aim of making nearly a focal the light beam onto the range changing lens unit E with an advantage of lowering the manufacturing tolerances, while still permitting good optical performance to be obtained.

When the positive refractive power of the fixed sub-unit RFF is too weak beyond the lower limit of the inequalities of condition (1), the diameter of the incident light beam on the range changing lens unit E gets larger, causing the difficulty of aberration correction to increase. Moreover, this calls for strengthening the positive refractive power of the entrance side of the range changing lens unit E. Thus it becomes difficult to shorten the total length of the entire lens system. Conversely when the positive refractive power of the fixed sub-unit RFF exceeds the upper limit, the diameter of the incident light beam on the range changing lens unit E gets smaller. Although this serves to shorten the total length of the lens, it becomes difficult to afford the long back focal distance before the range changing lens unit is attached. This also calls for making it necessary for the interchangeable sub-unit RFR to take a stronger negative refractive power, so it becomes very difficult to attain good correction of aberrations.

In the present embodiment, to well correct chromatic aberrations and other various aberrations for assuring high grade imaging performance throughout the entire range of variable focal length, it is preferred that, from front to rear, the fixed sub-unit RFF is constructed with a positive lens whose rear surface is convex toward the rear, or a positive lens whose front surface is convex toward the front and one doublet of a positive lens and a negative lens cemented together, and the interchangeable sub-unit RFR is constructed with at least one doublet of a positive lens and a negative lens either in broken contact or cemented together at their adjoining surfaces.

It is also preferred that the relay rear unit RR is constructed with a positive lens whose surfaces both are convex, two cemented doublets of a positive lens and a negative lens, or a negative lens and a positive lens, cemented together, and a positive lens.

Further, the range changing lens unit E is preferably constructed with inclusion of at least one positive lens whose surfaces both are convex and at least two cemented lenses.

Next, numerical examples 1 and 2 of the invention are shown. In the numerical examples 1 and 2, Ri represents the radius of curvature of the i-th lens surface counting from the object side, Di the i-th axial lens thickness or air separation counting from the object side, and Ni and $\nu i$ respectively the refractive index and Abbe number of the glass of the i-th lens element counting from the object side.

Numerical Example 1

Figure 3A:
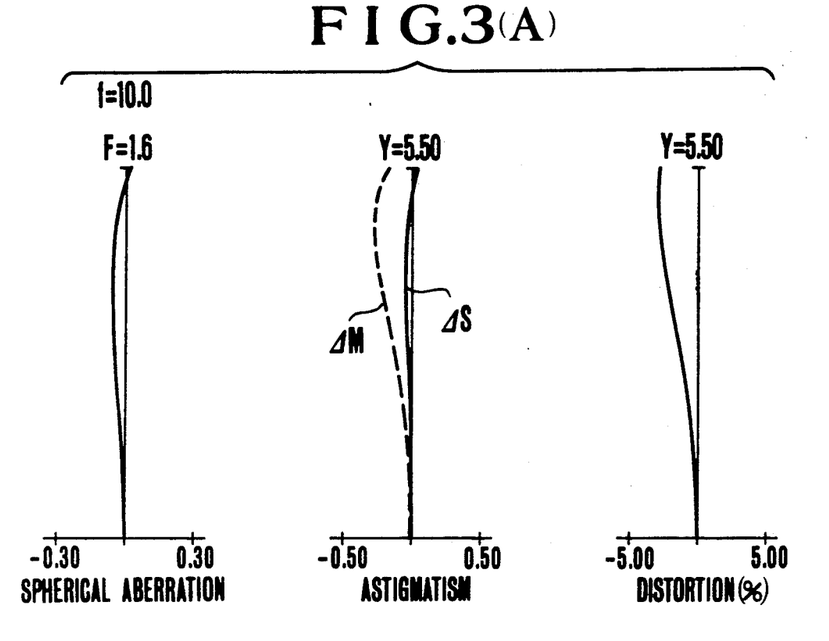
FIGS. 3(A) and 3(B) and FIGS. 4(A) and 4(B) are graphic representations of the various aberrations of the lenses of FIGS. 1 and 2 respectively.

(A) Before the change of the range of variable focal length (FIGS. 1(A) and 3(A)):

| f = 10-100 | | FNo = 1.6 | |
|---|---|---|---|
| R 1 = 5175.00 | D 1 = 2.50 | N 1 = 1.81265 | $\nu$ 1 = 25.4 |
| R 2 = 103.10 | D 2 = 6.00 | | |
| R 3 = 5175.00 | D 3 = 7.64 | N 2 = 1.43496 | $\nu$ 2 = 95.1 |
| R 4 = −115.35 | D 4 = 0.15 | | |
| R 5 = 88.50 | D 5 = 12.14 | N 3 = 1.49845 | $\nu$ 3 = 81.6 |
| R 6 = −166.67 | D 6 = 0.15 | | |
| R 7 = 52.77 | D 7 = 8.73 | N 4 = 1.69979 | $\nu$ 4 = 55.5 |
| R 8 = 139.59 | D 8 = Variable 11 | | |
| R 9 = 61.10 | D 9 = 1.00 | N 5 = 1.88814 | $\nu$ 5 = 40.8 |
| R10 = 18.76 | D10 = 3.80 | | |

-continued

| f = 10-100 | | FNo = 1.6 | |
|---|---|---|---|
| R11 = −63.98 | D11 = 0.80 | N 6 = 1.80811 | $\nu$ 6 = 46.6 |
| R12 = 82.33 | D12 = 3.76 | | |
| R13 = −16.14 | D13 = 0.80 | N 7 = 1.77621 | $\nu$ 7 = 49.6 |
| R14 = 307.48 | D14 = 3.20 | N 8 = 1.93306 | $\nu$ 8 = 21.3 |
| R15 = −28.88 | D15 = Variable 12 | | |
| R16 = −26.19 | D16 = 0.90 | N 9 = 1.77621 | $\nu$ 9 = 49.6 |
| R17 = 29.28 | D17 = 3.70 | N10 = 1.81265 | $\nu$10 = 25.4 |
| R18 = −786.13 | D18 = Variable 13 | | |
| R19 = −152.07 | D19 = 5.58 | N11 = 1.51356 | $\nu$11 = 51.0 |
| R20 = −27.28 | D20 = 0.10 | | |
| R21 = 3188.04 | D21 = 8.16 | N12 = 1.48915 | $\nu$12 = 70.2 |
| R22 = −25.19 | D22 = 1.40 | N13 = 1.88814 | $\nu$13 = 40.8 |
| R23 = −59.25 | D23 = 0.10 | | |
| R24 = 43.34 | D24 = 7.56 | N14 = 1.51356 | $\nu$14 = 51.0 |
| R25 = −115.35 | D25 = 1.50 | N15 = 1.80811 | $\nu$15 = 46.6 |
| R26 = 316.78 | D26 = 16.41 | | |
| R27 = 71.33 | D27 = 6.66 | N16 = 1.48915 | $\nu$16 = 70.2 |
| R28 = −213.23 | D28 = 0.15 | | |
| R29 = −8123.70 | D29 = 1.50 | N17 = 1.83932 | $\nu$17 = 37.2 |
| R30 = 43.07 | D30 = 11.72 | N18 = 1.48915 | $\nu$18 = 70.2 |
| R31 = −62.54 | D31 = 0.15 | | |
| R32 = 91.45 | D32 = 9.70 | N19 = 1.51313 | $\nu$19 = 60.5 |
| R33 = −32.98 | D33 = 1.40 | N20 = 1.83932 | $\nu$20 = 37.2 |
| R34 = −83.22 | D34 = 0.15 | | |
| R35 = 61.24 | D35 = 5.65 | N21 = 1.48915 | $\nu$21 = 70.2 |
| R36 = −1251.93 | D36 = 3.40 | | |
| R37 = ∞ | D37 = 55.50 | N22 = 1.51825 | $\nu$22 = 64.1 |
| R38 = ∞ | | | |

Variation of the Separations During Zooming

| f | 11 | 12 | 13 |
|---|---|---|---|
| 10 | 2.377 | 42.379 | 3.288 |
| 100 | 42.849 | 2.017 | 3.177 | fZ = −7.27
EZ = 27.17
fRFF = 63.77

Figure 3B:
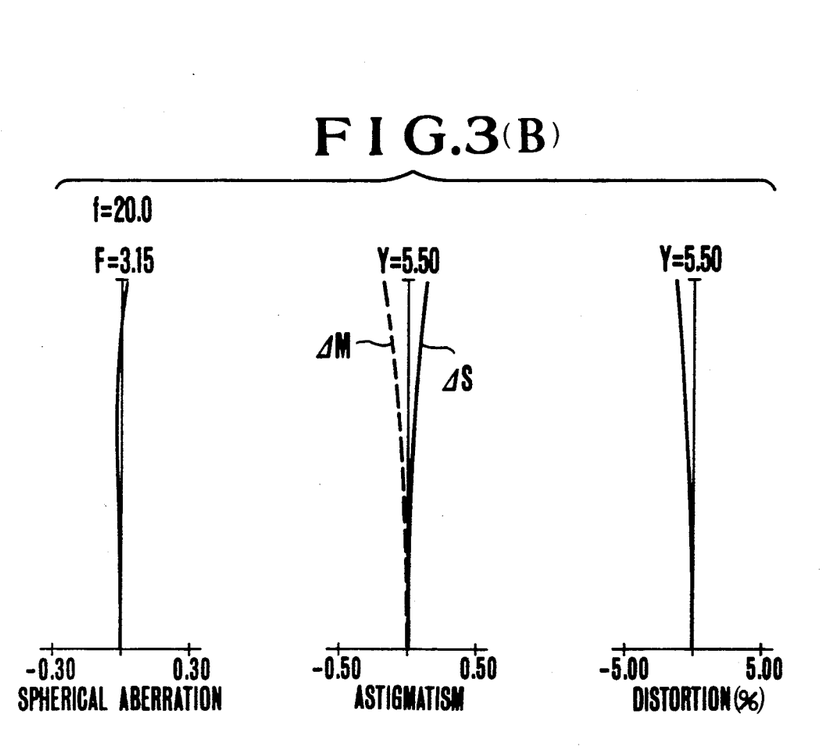

(B) After the change of the range of variable focal length (FIGS. 1(B) and 3(B):
f=20-200 F-Number =3.15
(R1 to R18 are the same as in Table (A).)

| R19 = −152.07 | D19 = 5.58 | N11 = 1.51356 | $\nu$11 = 51.0 |
|---|---|---|---|
| R20 = −27.28 | D20 = 0.10 | | |
| R21 = 1050.00 | D21 = 3.38 | N12 = 1.62286 | $\nu$12 = 60.3 |
| R22 = −83.35 | D22 = 0.15 | | |
| R23 = 29.70 | D23 = 5.22 | N13 = 1.62032 | $\nu$13 = 63.4 |
| R24 = −219.67 | D24 = 0.15 | | |
| R25 = 30.15 | D25 = 6.68 | N14 = 1.62286 | $\nu$14 = 60.3 |
| R26 = −67.84 | D26 = 1.20 | N15 = 1.93306 | $\nu$15 = 21.3 |
| R27 = 90.29 | D27 = 3.43 | | |
| R28 = −582.63 | D28 = 4.15 | N16 = 1.77621 | $\nu$16 = 49.6 |
| R29 = 23.92 | D29 = 2.96 | | |
| R30 = 115.39 | D30 = 3.57 | N17 = 1.70443 | $\nu$17 = 30.1 |
| R31 = −35.52 | D31 = 0.80 | N18 = 1.77621 | $\nu$18 = 49.6 |
| R32 = 40.08 | D32 = 3.45 | | |
| R33 = 71.33 | D33 = 6.66 | N19 = 1.48915 | $\nu$19 = 70.2 |
| R34 = −218.23 | D34 = 0.15 | | |
| R35 = −8123.70 | D35 = 1.50 | N20 = 1.83932 | $\nu$20 = 37.2 |
| R36 = 43.07 | D36 = 11.72 | N21 = 1.48915 | $\nu$21 = 70.2 |
| R37 = −62.54 | D37 = 0.15 | | |
| R38 = 91.45 | D38 = 9.70 | N22 = 1.51313 | $\nu$22 = 60.5 |
| R39 = −32.98 | D39 = 1.40 | N23 = 1.83932 | $\nu$23 = 37.2 |
| R40 = −83.22 | D40 = 0.15 | | |
| R41 = 61.24 | D41 = 5.65 | N24 = 1.48915 | $\nu$24 = 70.2 |
| R42 = −1251.93 | D42 = 3.40 | | |
| R43 = ∞ | D43 = 55.50 | N25 = 1.51825 | $\nu$25 = 64.1 |
| R44 = ∞ | | | |

Numerical Example 2

(A zoom lens as obtained by altering the relay lens unit of the numerical example 1)

Figure 2A:
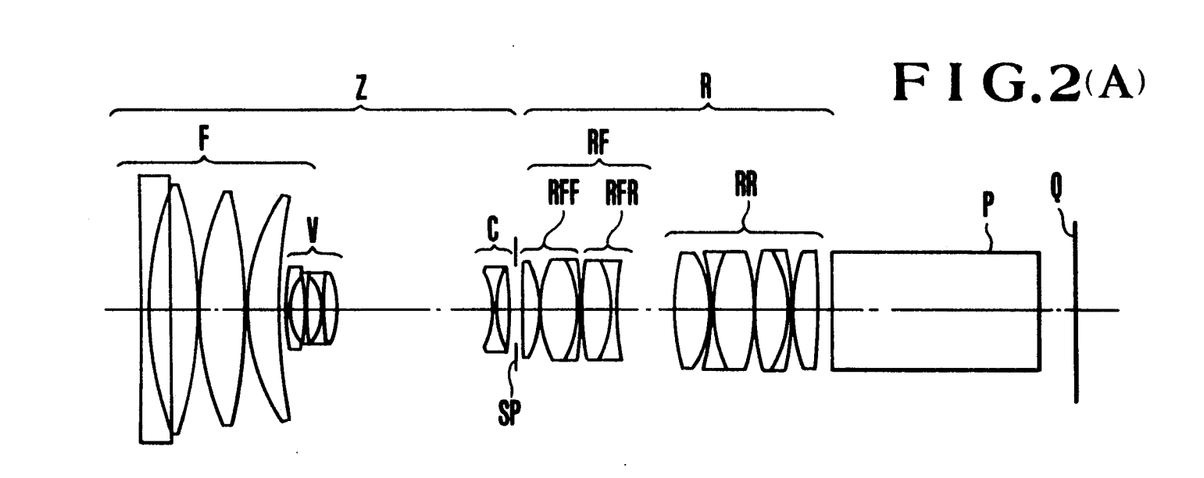
Figure 4A:
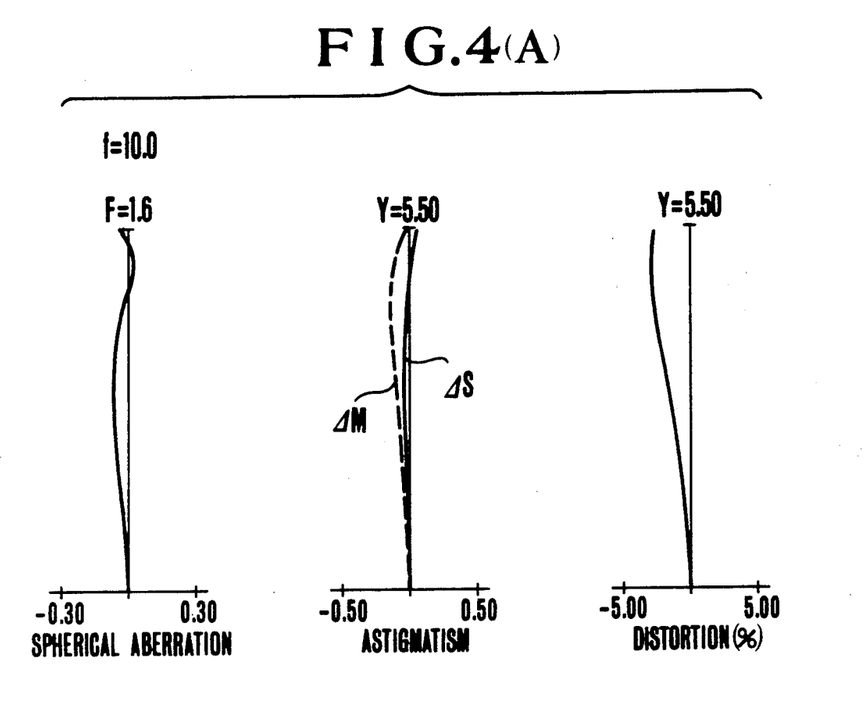

(A) Before the change of the range of variable focal length (FIGS. 2(A) and 4(A)):

f=10-100 F-Number=1.6

(R1 and R18 are the same as those in the numerical example 1.)

| | | | |
|---|---|---|---|
| R19 = 219.32 | D19 = 5.00 | N11 = 1.72794 | ν11 = 37.9 |
| R20 = −36.37 | D20 = 0.10 | | |
| R21 = 36.59 | D21 = 10.38 | N12 = 1.50014 | ν12 = 65.0 |
| R22 = −30.83 | D22 = 1.40 | N13 = 1.88814 | ν13 = 40.8 |
| R23 = −76.19 | D23 = 0.10 | | |
| R24 = 100.14 | D24 = 8.01 | N14 = 1.51356 | ν14 = 51.0 |
| R25 = −30.12 | D25 = 1.50 | N15 = 1.80811 | ν15 = 46.6 |
| R26 = 58.38 | D26 = 16.02 | | |
| R27 = 69.26 | D27 = 9.12 | N16 = 1.48915 | ν16 = 70.2 |
| R28 = −34.33 | D28 = 0.15 | | |
| R29 = −60.87 | D29 = 1.50 | N17 = 1.83932 | ν17 = 37.2 |
| R30 = 36.25 | D30 = 10.86 | N18 = 1.48915 | ν18 = 70.2 |
| R31 = −62.76 | D31 = 0.15 | | |
| R32 = 81.57 | D32 = 9.21 | N19 = 1.51313 | ν19 = 60.5 |
| R33 = −33.16 | D33 = 1.40 | N20 = 1.83932 | ν20 = 37.2 |
| R34 = −64.41 | D34 = 0.15 | | |
| R35 = 45.32 | D35 = 6.41 | N21 = 1.48915 | ν21 = 70.2 |
| R36 = −247.80 | D36 = 3.40 | | |
| R37 = ∞ | D37 = 55.50 | N22 = 1.51825 | ν22 = 64.1 |
| R38 = ∞ | | | |

$$fZ = -7.27$$
$$EZ = 25.51$$
$$fRFF = 27.99$$

Figure 2B:
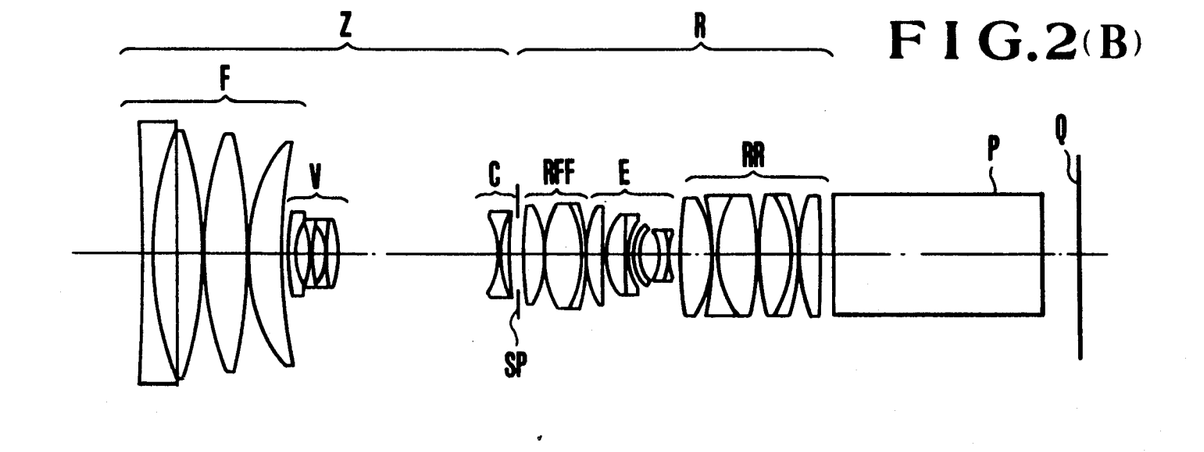
Figure 4B:
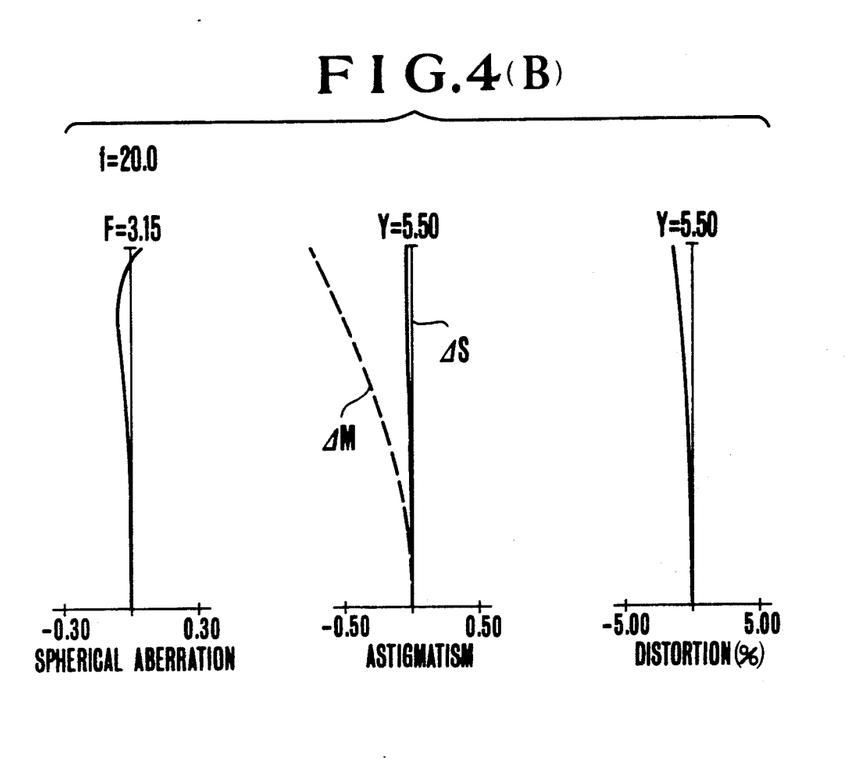

(B) After the change of the range of variable focal length (FIGS. 2(B) and 4(B)):

f=20-200 F-Number=3.15

(R1 and R18 are the same as those in Table (A).)

| | | | |
|---|---|---|---|
| R19 = 219.32 | D19 = 5.00 | N11 = 1.72794 | ν11 = 37.9 |
| R20 = −36.37 | D20 = 0.10 | | |
| R21 = 36.59 | D21 = 10.38 | N12 = 1.50014 | ν12 = 65.0 |
| R22 = −30.83 | D22 = 1.40 | N13 = 1.88814 | ν13 = 40.8 |
| R23 = −76.19 | D23 = 0.10 | | |
| R24 = 31.90 | D24 = 5.31 | N14 = 1.62286 | ν14 = 60.3 |
| R25 = −255.81 | D25 = 0.15 | | |
| R26 = 18.59 | D26 = 5.10 | N15 = 1.64254 | ν15 = 60.1 |
| R27 = 126.00 | D27 = 1.20 | N16 = 1.93306 | ν16 = 21.3 |
| R28 = 17.70 | D28 = 1.16 | | |
| R29 = 13.81 | D29 = 1.25 | N17 = 1.77621 | ν17 = 49.6 |
| R30 = 10.46 | D30 = 5.56 | | |
| R31 = −18.37 | D31 = 2.50 | N18 = 1.70443 | ν18 = 30.1 |
| R32 = −21.83 | D32 = 1.00 | N19 = 1.77621 | ν19 = 49.6 |
| R33 = −281.48 | D33 = 2.30 | | |
| R34 = 69.26 | D34 = 9.12 | N20 = 1.48915 | ν20 = 70.2 |
| R35 = −34.33 | D35 = 0.15 | | |
| R36 = −60.87 | D36 = 1.50 | N21 = 1.83932 | ν21 = 37.2 |
| R37 = 36.25 | D37 = 10.86 | N22 = 1.48915 | ν22 = 70.2 |
| R38 = −62.76 | D38 = 0.15 | | |
| R39 = 81.57 | D39 = 9.21 | N23 = 1.51313 | ν23 = 60.5 |
| R40 = −33.16 | D40 = 1.40 | N24 = 1.83932 | ν24 = 37.2 |
| R41 = −64.41 | D41 = 0.15 | | |
| R42 = 45.32 | D42 = 6.41 | N25 = 1.48915 | ν25 = 70.2 |
| R43 = −247.80 | D43 = 3.40 | | |
| R44 = ∞ | D44 = 55.50 | N26 = 1.51825 | ν26 = 64.1 |
| R45 = ∞ | | | |

Figure 5A:
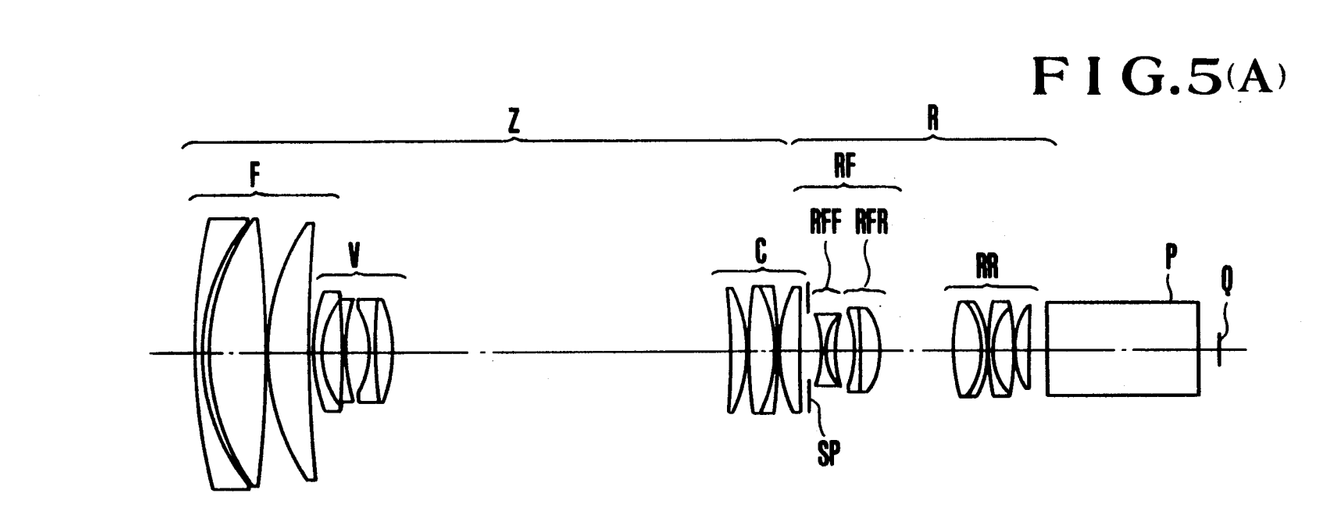
FIGS. 5(A) and 5(B) and FIGS. 6(A) and 6(B) are longitudinal section views of numerical examples 3 and 4 of specific zoom lenses of the invention.

FIG. 5(A) in block diagram shows another embodiment of the zoom lens capable of changing the range of variable focal length according to the invention with the ordinary range in operation. The zooming position illustrated here is the wide-angle end. The zoom lens comprises, from front to rear, a positive lens unit F having the focusing function, a negative variator V axially movable linearly over the entire range to affect variation of the magnification, a positive compensator C axially movable for compensating for the shift of an image plane in non-linear ways as the magnification varies from the minimum to the maximum, or vice versa, the focusing lens unit F, the variator V and the compensator C constituting a zoom section Z of positive refractive power, an aperture stop SP, and a relay lens unit R which remains stationary during focusing and zooming, the relay lens unit R consisting of two lens units, namely, a relay front unit RF and a relay rear unit RR, with the widest air separation in the unit R taken at the boundary, and the relay front unit RF being constructed from a fixed sub-unit RFF of negative refractive power and an interchangeable sub-unit RFR, followed by a three-color separation optical system including a prism P shown in developed form of an equivalent block in front of a focal plane Q at which all the image pickup tubes or solid state image sensors for three primary colors are positioned.

In the present embodiment, a zoom lens whose ordinary range, for example, in the numerical examples to be described later, is f=11.28–169.2 in the focal length, or 15 in the zoom ratio, as the variator V and the compensator C are moved.

Figure 5B:
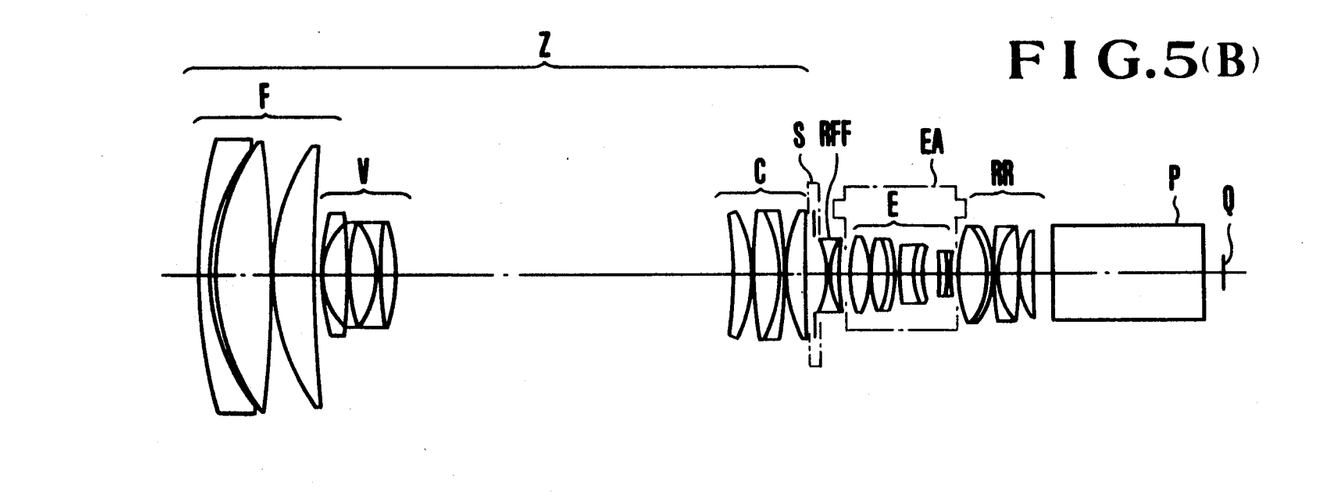

And to change the range of variable focal length to another limit, while leaving the fixed sub-unit RFF of negative refractive power of the relay front unit RF, the interchangeable sub-unit RFR is taken out of the optical path, and, instead, a range changing lens unit E of different refractive power from that of the interchangeable sub-unit RFR is inserted into and seated at the optical path between the fixed sub-unit RFF and the relay rear unit RR in the relay lens unit R, thereupon shifting the focal length f, for example, to a 2 times longer one as shown in the numerical examples to be described later. As a whole, the zooming range is thus changed to a one of f=22.56–338.4.

It should be noted in connection with FIG. 5(B) that a stop drive mechanisms S and a range changing lens unit attaching and detaching mechanism EA can be positioned in sufficiently spaced apart relation.

It will be appreciated from the foregoing that the present embodiment is to provide a novel form that while leaving a part of the relay front unit RF which lies at the front and is of the negative refractive power, that is, the fixed sub-unit RFF, the rear part whose refractive power may be positive or negative, that is, the interchangeable sub-unit RFR, is interchanged with the range changing lens unit E. By employing this form, it is made possible to realize a zoom lens in which good correction of aberrations throughout the entire zooming range is kept stable against change of the zooming range.

To achieve a shortening of the entire lens system in the longitudinal direction with the limitation of the back focal distance to long enough a value, while still preserving good correction of aberrations, the present embodiment sets forth the following condition:

$$-1.6 \leq fRFF/(fZ-EZ) \leq 0.4 \tag{2}$$

where fRFF is the focal length of the fixed sub-unit RFF, fZ is the focal length of the zoom section Z at any zooming position when focusing on an infinitely distant object, and EZ is the interval between the rear principal point of the zoom section Z and the front principal point of the fixed sub-unit RFF.

The inequalities of condition (2) have a main aim of making nearly a focal the light beam onto the range changing lens unit E with an advantage that the manufacturing tolerances may be made less rigorous, yet good optical performance can be secured.

When the upper limit of the inequalities of condition (2) is exceeded, because the negative refractive power of the fixed sub-unit RFF becomes too strong, a light beam of greatly increased diameter arrives at the range changing lens unit E, causing the difficulty of aberration correction to increase. Moreover, this calls for a large increase of the positive refractive power at the entrance side of the range changing lens unit E, thus sacrificing the shortening of the total length of the zoom lens. Conversely when the lower limit is exceeded, the weakening of the negative refractive power of the fixed sub-unit RFF decreases the diameter of the incident light beam on the range changing lens unit E, so it becomes difficult to keep the back focal distance long enough after the range changing lens unit E is detached. This also calls for the necessity of a stronger negative refractive power to be used in the interchangeable sub-unit RFR. Hence, it becomes very difficult to attain a better result of aberration correction.

To stabilize good correction of aberrations including chromatic ones throughout the entire zooming range to obtain a high grade imaging performance, it is preferred to construct the fixed sub-unit RFF as comprising, from front to rear, either a negative lens whose surfaces both are concave and a meniscus-shaped positive lens convex toward the object side in broken contact or in cemented contact, or a meniscus-shaped positive lens convex toward the image side and a negative lens whose surfaces both are concave in broken contact or cemented contact.

The interchangeable sub-unit RFR is preferably constructed from a negative lens and a positive lens in broken contact or in cemented contact.

It is also preferred that the relay rear unit RR is constructed from a cemented doublet consisting of a positive lens whose surfaces both are convex and a negative lens cemented together, another cemented doublet consisting of a negative lens and a positive lens with the cemented surface turning its convex curvature toward the object side, and a positive lens.

Further, the range changing lens unit E is preferably constructed with inclusion of a positive lens whose surfaces both are convex and three cemented doublets.

Next, numerical examples 3 and 4 of the invention are shown. In the numerical examples 3 and 4, Ri represents the radius of curvature of the i-th lens surface counting from the front, Di the i-th axial lens thickness or air separation counting from the front, and Ni and $\nu i$ respectively the refractive index and Abbe number of the glass of the i-th lens element counting from the front.

Numerical Example 3

Figure 7A:
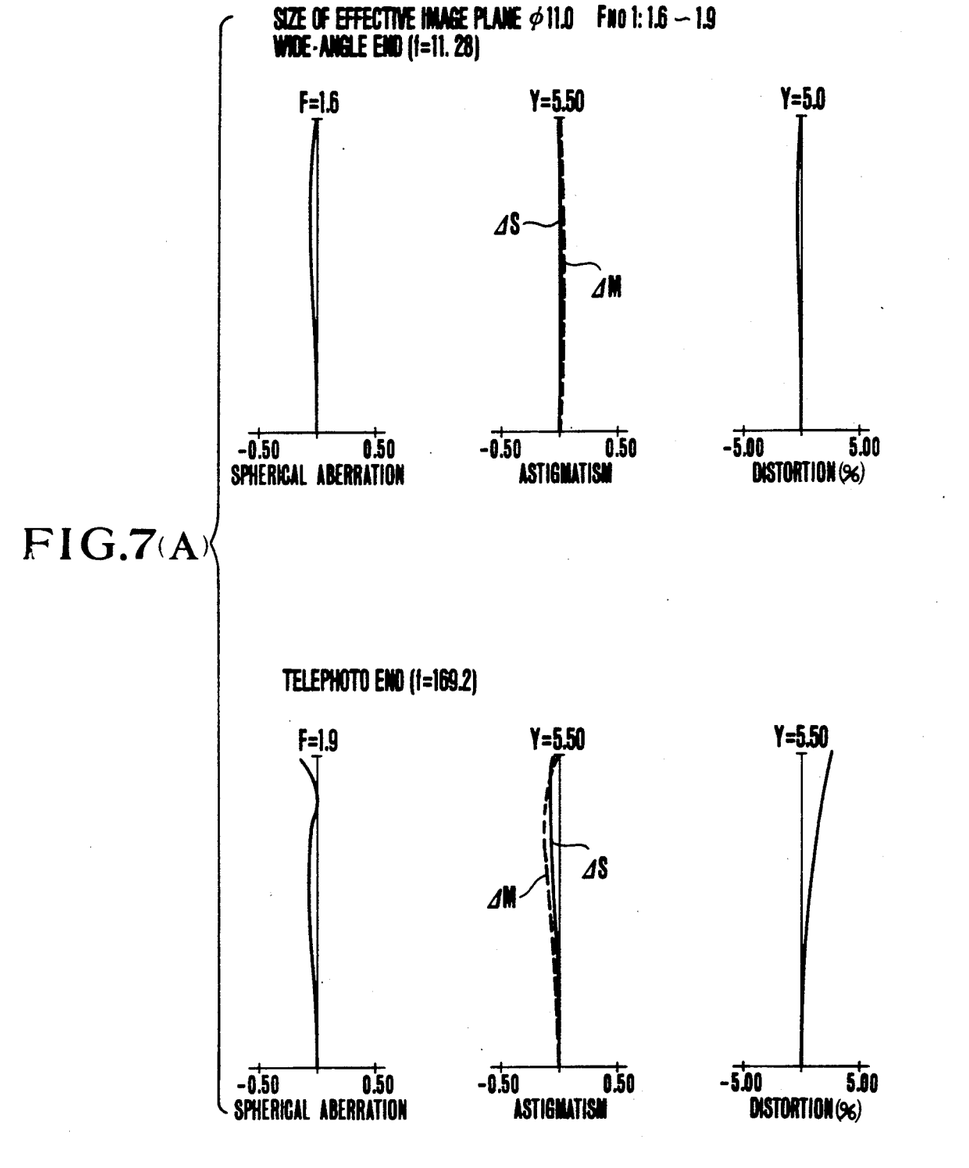
FIGS. 7(A) and 7(B) and FIGS. 8(A) and 8(B) are graphic representations of the various aberrations of the lenses of FIGS. 5 and 6 respectively.

(A) Before the change of the range of variable focal length (FIGS. 5(A) and 7(A)):
$f = 11.28 - 43.77 - 169.2$

| NO. | R | D | nd | νd |
|---|---|---|---|---|
| 1 | 201.36 | 3.09 | 1.688930 | 31.08 |
| 2 | 79.60 | 1.64 | 1. | |
| 3 | 81.68 | 18.98 | 1.487490 | 70.21 |
| 4 | −434.22 | 0.20 | 1. | |
| 5 | 79.67 | 14.09 | 1.516330 | 64.15 |
| 6 | 581.25 | | | |

-continued

| NO. | R | D | nd | νd |
|---|---|---|---|---|
| | | 11: Variable | | |
| 7 | 70.95 | 1.65 | 1.772499 | 49.60 |
| 8 | 29.20 | 6.75 | 1. | |
| 9 | −2104.50 | 1.51 | 1.772499 | 49.60 |
| 10 | 59.82 | 8.56 | 1. | |
| 11 | −32.42 | 1.51 | 1.772499 | 49.60 |
| 12 | 345.76 | 4.32 | 1.922864 | 21.29 |
| 13 | −65.28 | | 1. | |
| | | 12: Variable | | |
| 14 | −535.12 | 6.13 | 1.487490 | 70.21 |
| 15 | −50.92 | 0.20 | 1. | |
| 16 | 263.61 | 8.55 | 1.639999 | 60.09 |
| 17 | −47.42 | 1.65 | 1.805177 | 25.43 |
| 18 | −147.42 | 0.20 | 1. | |
| 19 | 53.82 | 7.02 | 1.487490 | 70.21 |
| 20 | −646.25 | | 1. | |
| | | 13: Variable | | |
| 21 | Stop | 4.09 | 1. | |
| 22 | −34.54 | 0.96 | 1.651597 | 58.52 |
| 23 | 24.78 | 3.35 | 1.698947 | 30.12 |
| 24 | 49.32 | 6.57 | 1. | |
| 25 | −29.97 | 1.03 | 1.639999 | 60.09 |
| 26 | −2416.74 | 6.00 | 1.688930 | 31.08 |
| 27 | −27.45 | 23.37 | 1. | |
| 28 | 101.35 | 8.47 | 1.487490 | 70.21 |
| 29 | −28.60 | 1.51 | 1.755199 | 27.51 |
| 30 | −38.07 | 0.13 | 1. | |
| 31 | 175.76 | 1.30 | 1.755199 | 27.51 |
| 32 | 27.12 | 6.72 | 1.511179 | 51.02 |
| 33 | −276.56 | 0.75 | 1. | |
| 34 | 43.76 | 3.98 | 1.487490 | 70.21 |
| 35 | ∞ | 5.70 | 1. | |
| 36 | ∞ | 47.57 | 1.516330 | 64.15 |
| 37 | ∞ | 6.00 | 1. | |

Variation of the Separations during zooming

| f | l1 | l2 | l3 |
|---|---|---|---|
| 11.28 | 1.6756 | 110.0506 | 2.0492 |
| 43.77 | 48.9756 | 48.7746 | 16.0251 |
| 169.2 | 71.2156 | 2.0657 | 40.4940 |

In the Wide-Angle End:
fZ = 14.3514
EZ = −33.4773
fRFF = −31.5146

Figure 7B:
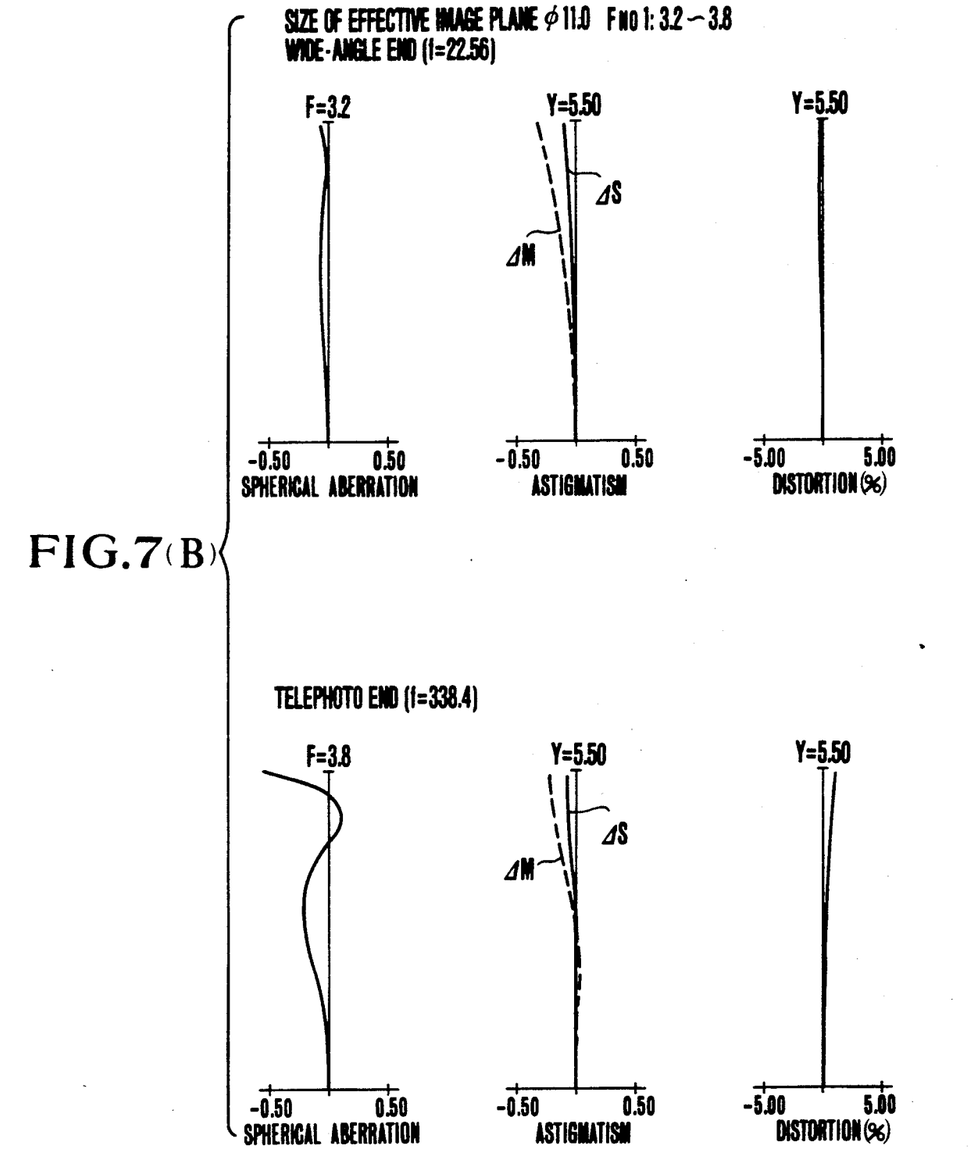

(B) After the change of the range of variable focal length (FIGS. 5(B) and 7(B)):
$f = 22.56 - 87.54 - 338.4$
(R1 to R20 are the same as those in Table (A).)

| NO. | R | D | nd | νd |
|---|---|---|---|---|
| 21 | Stop | 4.09 | 1. | |
| 22 | −34.54 | 0.96 | 1.651597 | 58.52 |
| 23 | 24.78 | 3.35 | 1.698947 | 30.12 |
| 24 | 49.32 | 3.09 | 1. | |
| 25 | 50.39 | 6.17 | 1.622799 | 57.06 |
| 26 | −43.67 | 0.13 | 1. | |
| 27 | 77.25 | 5.54 | 1.620410 | 60.28 |
| 28 | −35.20 | 1.71 | 1.772499 | 49.60 |
| 29 | −97.51 | 2.21 | 1. | |
| 30 | 74.44 | 4.12 | 1.772499 | 49.60 |
| 31 | 21.38 | 2.56 | 1.688930 | 31.08 |
| 32 | 22.60 | 5.36 | 1. | |
| 33 | −72.80 | 2.61 | 1.688930 | 31.08 |
| 34 | −36.15 | 1.37 | 1.772499 | 49.60 |
| 35 | 81.00 | 2.06 | 1. | |
| 36 | 101.35 | 8.47 | 1.487490 | 70.21 |
| 37 | −28.60 | 1.51 | 1.755199 | 27.51 |
| 38 | −38.07 | 0.13 | 1. | |
| 39 | 175.76 | 1.30 | 1.755199 | 27.51 |
| 40 | 27.12 | 6.72 | 1.511179 | 51.02 |
| 41 | −276.56 | 0.75 | 1. | |

-continued

| NO. | R | D | nd | νd |
|---|---|---|---|---|
| 42 | 43.76 | 3.98 | 1.487490 | 70.21 |
| 43 | ∞ | 5.70 | 1. | |
| 44 | ∞ | 47.57 | 1.516330 | 64.15 |
| 45 | ∞ | 6.00 | 1. | |

Numerical Example 4

(A zoom lens as obtained by altering the relay lens unit of the numerical example 3)

Figure 6A:
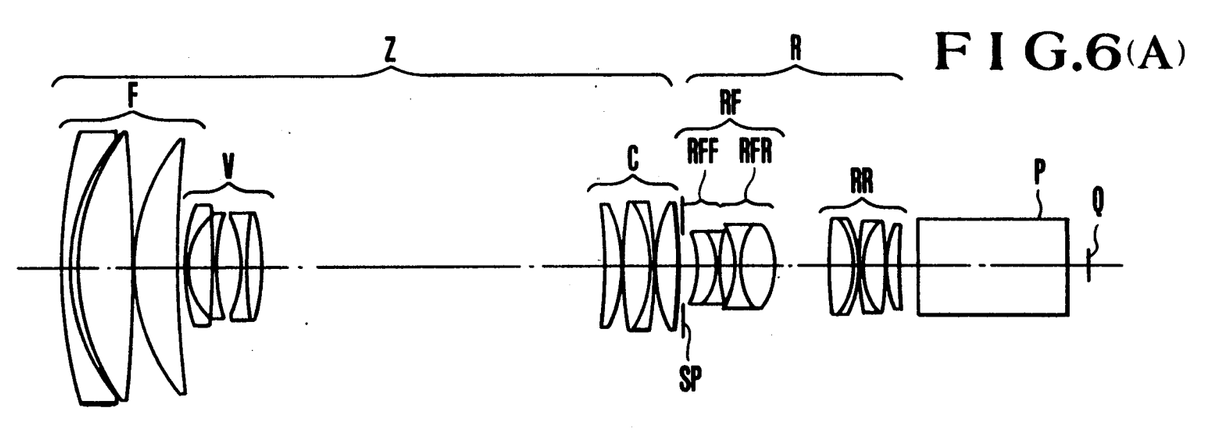
Figure 8A:
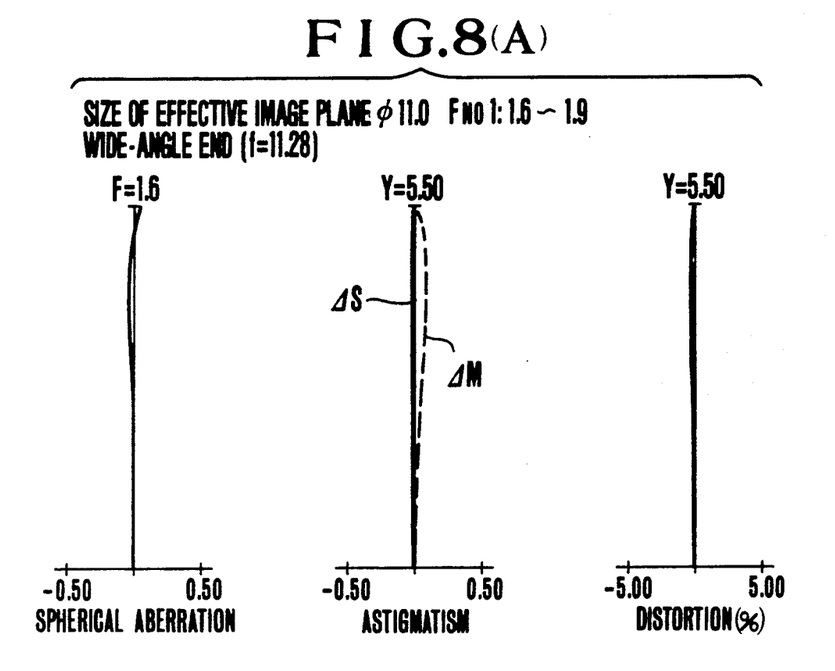

(A) Before the change of the range of variable focal length (FIGS. 6(A) and 8(A)):

f=11.28-43.77-169.2

(R1 to R20 are the same as those in the numerical example 3.)

| NO. | R | D | nd | νd |
|---|---|---|---|---|
| 21 | Stop | 3.82 | 1. | |
| 22 | −34.27 | 6.54 | 1.755199 | 27.51 |
| 23 | −22.80 | 0.96 | 1.501372 | 56.40 |
| 24 | 113.71 | 4.99 | 1. | |
| 25 | −29.07 | 1.03 | 1.772499 | 49.60 |
| 26 | 34.78 | 11.01 | 1.625882 | 35.70 |
| 27 | −28.97 | 15.81 | 1. | |
| 28 | 101.35 | 8.47 | 1.487490 | 70.21 |
| 29 | −28.60 | 1.51 | 1.755199 | 27.51 |
| 30 | −38.07 | 0.13 | 1. | |
| 31 | 175.76 | 1.30 | 1.755199 | 27.51 |
| 32 | 27.12 | 6.72 | 1.511179 | 51.02 |
| 33 | −276.56 | 0.75 | 1. | |
| 34 | 43.76 | 3.98 | 1.487490 | 70.21 |
| 35 | ∞ | 2.75 | 1. | |
| 36 | ∞ | 47.57 | 1.516330 | 64.15 |
| 37 | ∞ | 3.57 | 1. | |

In the Wide-Angle End:

fZ=14.3514

EZ=−36.3631 fRFF=−67.6188

Figure 6B:
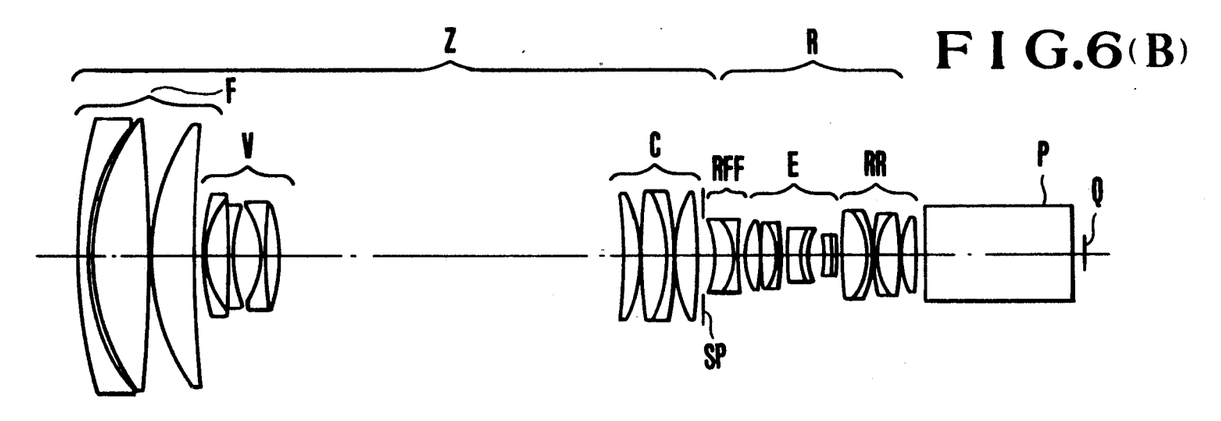
Figure 8B:
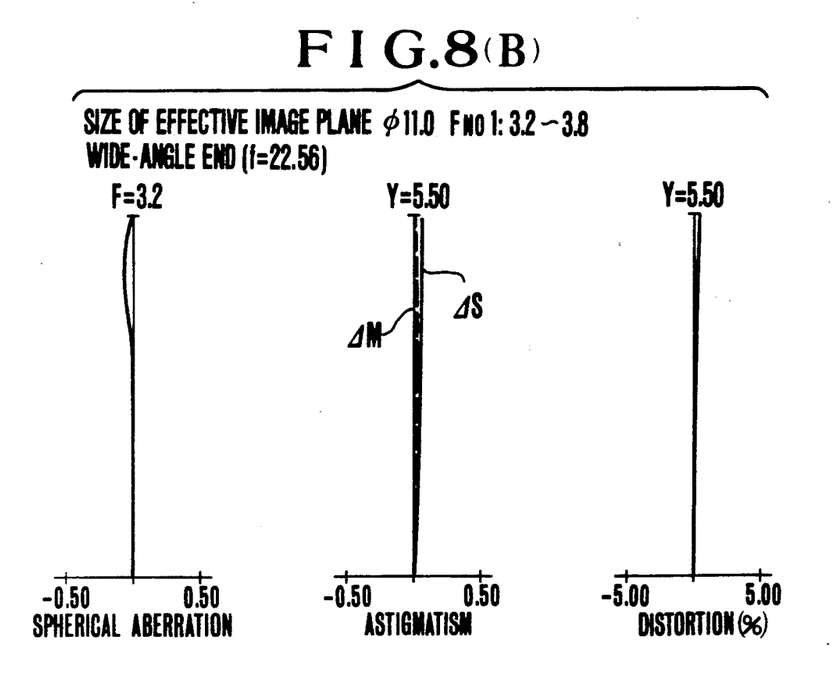

(B) After the change of the range of variable focal length (FIGS. 6(B) and 8(B)):

f=22.56-87.54-338.4

(R1 to R20 are the same as those in the numerical example 3.)

| NO. | R | D | nd | νd |
|---|---|---|---|---|
| 21 | Stop | 3.82 | 1. | |
| 22 | −34.27 | 6.54 | 1.755199 | 27.51 |
| 23 | −22.80 | 0.96 | 1.501372 | 56.40 |
| 24 | 113.71 | 2.75 | 1. | |
| 25 | 31.38 | 4.41 | 1.622799 | 57.06 |
| 26 | −180.11 | 0.68 | 1. | |
| 27 | −1032.00 | 4.24 | 1.622799 | 57.06 |
| 28 | −23.82 | 1.51 | 1.772499 | 49.60 |
| 29 | −73.20 | 1.62 | 1. | |
| 30 | 130.02 | 4.81 | 1.772499 | 49.60 |
| 31 | 18.36 | 1.88 | 1.688930 | 31.08 |
| 32 | 18.44 | 5.23 | 1. | |
| 33 | −71.88 | 2.60 | 1.688930 | 31.08 |
| 34 | −48.95 | 1.23 | 1.772499 | 49.60 |
| 35 | 219.20 | 1.85 | 1. | |
| 36 | 101.35 | 8.47 | 1.487490 | 70.21 |
| 37 | −28.60 | 1.51 | 1.755199 | 27.51 |
| 38 | −38.07 | 0.13 | 1. | |
| 39 | 175.76 | 1.30 | 1.755199 | 27.51 |
| 40 | 27.12 | 6.72 | 1.511179 | 51.02 |
| 41 | −276.56 | 0.75 | 1. | |
| 42 | 43.76 | 3.98 | 1.487490 | 70.21 |
| 43 | ∞ | 2.75 | 1. | |
| 44 | ∞ | 47.57 | 1.516330 | 64.15 |
| 45 | ∞ | 3.56 | 1. | |

According to the invention, the relay lens unit arranged on the image side of the zoom section and the stop is constructed in the form described above so that a lens unit constituting part of it is interchanged with the range changing lens unit. By employing such a form, it is made possible to achieve realization of a zoom lens capable of changing the range of variable focal length which maintains a shortening of the total length of the entire system to be achieved, yet secures the long back focal distance, and compensates for variation of the aberrations between before and after the change of the range of variable focal length, yet preserves good optical performance throughout the entire zooming range.

What is claimed is:

1. A zoom lens capable of changing the range of variable focal length, comprising:

a zoom section having positive refractive powers that are independent of zooming, and a plurality of movable lens units arranged to axially move to affect zooming in a predetermined range of variable focal length;

a stop arranged on the image surface side of said zoom section to determine an F-number of said zoom lens;

a relay lens section arranged on the image surface side of said stop to form an image with a light beam emerging from said zoom section and having a front lens unit and a rear lens unit, said front lens unit of said relay lens section being provided with a fixed sub-unit having a negative refractive power and a detachably mounted sub-unit;

a range changing lens unit so arranged that when said detachably mounted sub-unit is detached to change the range of variable focal length, said range changing lens unit is attached in a space between said fixed sub-unit and said rear lens unit;

wherein the minimum spacing between the last movable lens unit of said zoom section and said fixed sub-unit is larger than the spacing between said fixed sub-unit and said detachably mounted sub-unit; and the zoom lens satisfies the following condition:

$$-1.6 \leq fRFF/(fZ-EZ) \leq -0.4$$

where fRFF is a focal length of said fixed sub-unit, fZ is a focal length of said zoom section in any desired zooming position when focusing on an infinitely distant object, and EZ is an interval between a rear principal point of said zoom section and a front principal point of said fixed sub-unit.

2. A zoom lens according to claim 1, wherein said range changing lens unit is a telephoto system.

3. A zoom lens capable of changing the range of variable focal length, comprising:

a zoom section having a plurality of movable lens units arranged to axially move to affect zooming in a predetermined range of variable focal length;

a stop arranged on the image surface side of said zoom section to determine an F-number of said zoom lens;

a relay lens section arranged on the image surface side of said stop to form an image with a light beam emerging from said zoom section and having a front lens unit and a rear lens unit, said front lens unit of said relay lens section being provided with a fixed sub-unit and a detachably mounted sub-unit;

a range changing lens unit so arranged that when said detachably mounted sub-unit is detached to change the range of variable focal length, said range changing lens unit is attached in a space between said fixed sub-unit and said rear lens unit; and wherein said zoom section has always positive composite refractive powers independent of zooming, and said fixed sub-unit has a negative refractive power.

4. A zoom lens according to claim 3, satisfying the following condition:

$$-1.6 \leq fRFF/(fZ-EZ) \leq 0.4$$

where fRFF is a focal length of said fixed sub-unit, fZ is a focal length of said zoom section in any desired zooming position when focusing on an infinitely distant object, and EZ is an interval between a rear principal point of said zoom section and a front principal point of said fixed sub-unit.

5. A zoom lens capable of changing the range of variable focal length, comprising:
  a zoom section having a plurality of movable lens units arranged to axially move to affect zooming in a predetermined range of variable focal length;
  a stop arranged on the image surface side of said zoom section to determine an F-number of said zoom lens;
  a relay lens section arranged on the image surface side of said stop to form an image with a light beam emerging from said zoom section and having a front lens unit and a rear lens unit, said front lens unit of said relay lens section being provided with a fixed sub-unit and a detachably mounted sub-unit;
  a range changing lens unit so arranged that when said detachably mounted sub-unit is detached to change the range of variable focal length, said range changing lens unit is attached in a space between said fixed sub-unit and said rear lens unit;
  wherein said zoom section has always negative composite refractive powers independent of zooming and said fixed sub-unit has a positive refractive power; and
  said zoom lens satisfies the following condition:

$$-2.0 \leq fRFF/(fZ-EZ) \leq -0.6$$

where fRFF is a focal length of said fixed sub-unit, fZ is a focal length of said zoom section in any desired zooming position when focusing on an infinitely distant object, and EZ is an interval between a rear principal point of said zoom section and a front principal point of said fixed sub-unit.

* * * * *

UNITED STATES PATENT AND TRADEMARK OFFICE
CERTIFICATE OF CORRECTION

PATENT NO. : 5,097,360

DATED : March 17, 1992

INVENTOR(S) : KIYOSHI FUKAMI, ET AL.

It is certified that error appears in the above-identified patent and that said Letters Patent is hereby corrected as shown below:

Column 1:
    Line 5, "division" should read --continuation--.
    Line 10, "relates," should read --relates--.

Column 4:
    Line 59, "$-2.0 \leq fRFF/(fZ - EZ) \leq 0.6$" should read -- $-2.0 \leq fRFF/(fZ - EZ) \leq -0.6$--.
    Line 67, "a" should read --afocal--.
    Line 68, "focal" should be deleted.

Column 7:
    Line 67, "affect" should read --effect--.

Column 8:
    Line 61, "$-1.6 \leq fRFF/(fZ - EZ) \leq 0.4$" should read -- $-1.6 \leq fRFF/(fZ - EZ) \leq -0.4$--.

Column 9:
    Line 2, "a focal" should read --afocal--.

UNITED STATES PATENT AND TRADEMARK OFFICE
CERTIFICATE OF CORRECTION

PATENT NO. : 5,097,360

DATED : March 17, 1992

INVENTOR(S) : KIYOSHI FUKAMI, ET AL.

It is certified that error appears in the above-identified patent and that said Letters Patent is hereby corrected as shown below:

<u>Column 12</u>:

Line 21, "affect" should read --effect--.

Line 58, "affect" should read --effect--.

<u>Column 13</u>:

Line 15, "$-1.6 \leq fRFF/(fZ - EZ) \leq 0.4$" should read -- $-1.6 \leq fRFF/(fZ - EZ) \leq -0.4$--.

Line 27, "affect" should read --effect--.

Signed and Sealed this

Twenty-ninth Day of June, 1993

Attest:

MICHAEL K. KIRK

*Attesting Officer*     *Acting Commissioner of Patents and Trademarks*